(12) United States Patent
Reid (10) Patent No.: US 7,643,698 B2  
(45) Date of Patent: Jan. 5, 2010

(54) IMAGE SHARPENING USING DIFFUSION

(75) Inventor: Russell M. Reid, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 683 days.

(21) Appl. No.: 11/316,776

(22) Filed: Dec. 22, 2005

(65) Prior Publication Data

US 2007/0147698 A1    Jun. 28, 2007

(51) Int. Cl.
    *G06K 9/40*    (2006.01)
(52) U.S. Cl. .................................. 382/263; 382/266
(58) Field of Classification Search ................ 382/254, 382/263, 266, 274
    See application file for complete search history.

(56) References Cited

U.S. PATENT DOCUMENTS

| 5,038,388 | A | * | 8/1991 | Song | 382/266 |
| 5,875,267 | A | * | 2/1999 | Djakovic | 382/263 |
| 5,896,469 | A | * | 4/1999 | Murakami | 382/266 |
| 6,421,468 | B1 | * | 7/2002 | Ratnakar et al. | 382/254 |
| 6,430,318 | B1 | * | 8/2002 | Florent et al. | 382/260 |

(Continued)

OTHER PUBLICATIONS

Manuel M. Oliveira, Brian Bowen, Richard McKenna and Yu-Sung Chang, "Fast Digital Image Inpainting", Appeared in the Proceedings of the International Conference on Visualization, Imaging and Image Processing (VIIP 2001), Marbella, Spain. Sep. 3-5, 2001, pp. 1-6.*

Yuying Li and Fadil Santosa, "A Computational Algorithm for Minimizing Total Variation in Image Restoration", IEEE Transactions on Image Processing, vol. 5, No. 6, Jun. 1996, pp. 987-995.*

Frederick M. Waltza and John W. V. Millerb, "An efficient algorithm for Gaussian blur using finite-state machines", SPIE Conf. on Machine Vision Systems for Inspection and Metrology VII, Originally published Boston, Nov. 1998, pp. SK21-1 to SK21-8.*

(Continued)

*Primary Examiner*—Brian Q Le  
*Assistant Examiner*—Mekonen Bekele  
(74) *Attorney, Agent, or Firm*—Hickman Palermo Truong & Becker LLP; Daniel D. Ledesma (57) ABSTRACT

An improved sharpening technique sharpens an image using diffusion rather than a Gaussian blur in the smearing phase. After an appropriate radius or number of passes is determined for the pixels of an image, a diffusive process is applied to the image in the smearing phase to generate a blurred image. The values of each pixel in the original image are differenced with the values of each corresponding pixel in the blurred image. The difference may be weighted by input from a user. The resulting value is added to the original image and a sharpened version of the original image is created.

27 Claims, 2 Drawing Sheets

U.S. PATENT DOCUMENTS

| | | | |
|---|---|---|---|
| 6,526,179 B2 * | 2/2003 | Goldstein et al. | 382/254 |
| 6,724,945 B1 * | 4/2004 | Yen et al. | 382/274 |
| 6,788,824 B1 * | 9/2004 | Prestia | 382/263 |
| 7,103,228 B2 * | 9/2006 | Kraft et al. | 382/274 |
| 7,359,576 B1 * | 4/2008 | Worthington et al. | 382/279 |
| 7,544,919 B2 * | 6/2009 | Nattress | 250/201.4 |
| 2003/0146975 A1 * | 8/2003 | Joung et al. | 348/164 |
| 2006/0159351 A1 * | 7/2006 | Bae et al. | 382/233 |
| 2008/0116353 A1 * | 5/2008 | Nattress | 250/201.4 |
| 2008/0187219 A1 * | 8/2008 | Chen et al. | 382/173 |

OTHER PUBLICATIONS

"Gaussian Smoothing" retrieved on Feb. 27, 2006 from the Internet < URL: http://homepages.infed.ac.uk/rbf/HIPR2/gsmooth.htm > (8 pages).

"Unsharp masking" retrieved on Feb. 27, 2006 from the Internet < URL: http://en.wikipedia.org/wiki/Unsharp_masking> (3 pages).

* cited by examiner

IMAGE SHARPENING USING DIFFUSION

FIELD OF THE INVENTION

The present invention relates generally to digital image processing and, more specifically, to techniques for sharpening an image using diffusion to first blur the image.

BACKGROUND OF THE INVENTION

Editing digital images is a practice used by photography professionals and amateurs alike, given the wide availability of photo editing software. A type of editing common to all digital image processing is image sharpening. Image sharpening emphasizes the changes in an image; that is, it accentuates changes in a dark to light band as opposed to smoothing the change out across pixels.

There are limitations to image sharpening, however. Specifically, sharpening emphasizes "noise." "Noise" in an image is the random fluctuation above and below actual image data and is a product of measuring imperfectly.

Unsharp masking is one kind of sharpening that is not too noise sensitive. Unsharp masking includes a smear phase and a differencing phase. Using the technique of unsharp masking produces a sharpened image based on a multiple of the difference between the pixel values in an original image and the corresponding pixel values of a blurred copy of the original image. Ordinarily, the blurred copy is computed by a convolution with a Gaussain, both of which are defined below.

Convolutions and Kernels

Convolution is a simple mathematical operation which is fundamental to many common image processing operators. Convolution provides a way of multiplying together two arrays of numbers, generally of different sizes, but of the same dimensionality, to produce a third array of numbers of the same dimensionality. The first array of numbers, in an image processing context, is the actual image, and the second array of numbers is a kernel. The kernel is applied against the image (added, multiplied, etc.) via convolution. Convolution is used in image processing to implement operators whose output pixel values are simple linear combinations of certain input pixel values.

By way of illustration, in an image processing context, one of the input arrays is simply a graylevel image. The second array is usually much smaller, and is also two-dimensional (although it may be just a single pixel thick), and is known as the kernel. The convolution is performed by sliding the kernel over the image, generally starting at the top left corner, so as to move the kernel through all the positions where the kernel fits entirely within the boundaries of the image. Each kernel position corresponds to a single output pixel, the value of which is calculated by multiplying together the kernel value and the underlying image pixel value for each of the cells in the kernel, and then adding all these numbers together.

Gaussain Blurs

The Gaussian smoothing operator is a two-dimensional convolution operator that is used to blur images and remove detail and noise. It uses a kernel that represents the shape of a Gaussian ("bell-shaped") hump. The idea of Gaussian smoothing is to use this 2-D distribution as a point-spread function, and this is achieved by convolution. Since the image is stored as a collection of discrete pixels, a discrete approximation to the Gaussian function is produced before convolution is performed.

Gaussian blurs are an obvious choice for the smearing phase of unsharp masking, not because of its shape, but because it is, in theory, infinitely smooth. However, there are several problems with Gaussian blurs. First, true Gaussians have infinite extent, which is impossible in a kernel. Therefore, some approximation is required. The approximation must always include truncating the Gaussian kernel. A truncated Gaussian is no longer infinitely smooth, which is one of its critical characteristics. In addition to truncation, discretization (i.e. the process of converting from real values to discrete values) magnifies the non-smoothness of a truncated Gaussian kernel. When an image is convolved with a non-smooth kernel, any lack of smoothness of the blurring curve gets magnified in the differencing phase, which introduces noise into the image.

Second, Gaussian blurs take a relatively long time to compute, despite the availability of ever faster processors. Computation complexity is an issue because the size of digital images today generally begins around 5 mega pixels for amateur photo editors and can be as high as 15 mega pixels for professional photographers. Gaussian kernels are generally 5×5 matrices, which means that for each pixel in a graylevel image there might be 25 calculations, and for each pixel in a color image there might be 75 calculations (because the Gaussian blur is performed on each red, green, and blue pixel value in each pixel). Thus, for a 10 mega pixel color image, one Gaussian blur makes approximately 750,000,000 calculations. Such a strain on a processor is significant. As a result, many software applications, instead of performing all the required calculations, perform a shortcut by attempting to approximate Gaussian blurs, which results in even less of a smooth blurring and increases noise.

Lastly, Gaussian blurs do not work well at very small pixel radii, such as one pixel, which is most often what a user wants. There are several reasons for this. First, a Gaussian kernel must have the sum of its weight equal to 1. If it is very small-width kernel, the weights applied to individual pixels are large, which reduces smoothing. Second, the discretization error is proportionally much larger when a Gaussian kernel is approximated over only nine pixels, the minimum possible size (because the source kernel must be at the center and the kernel must be square, the kernel size must be the square of an odd number. A 1×1 kernel does nothing. Third, the undesirable effects of truncation are large because the individual pixel weights are large, so the dropoff to zero outside the kernel is sharp. Finally, the fundamental nature of a Gaussian blur is superposition, which roughly means blurring each pixel individually and summing the results. Thus, a Gaussian blur emphasizes precision over smoothness.

Based on the foregoing, there is room for improvement in image sharpening, particularly in the smearing phase of the process.

The techniques described in this section are techniques that could be pursued, but not necessarily techniques that have been previously conceived or pursued. Therefore, unless otherwise indicated, it should not be assumed that any of the techniques described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION INTRODUCTION

Techniques are described herein for sharpening an image using diffusion rather than Gaussian blurring for the smearing phase of unsharp masking. Not only is diffusion faster, but it also produces sharper images when implemented in unsharp masking.

There are many mathematical and physical processes that produce diffusions. One of the classic physical processes is heat flow. The behavior of heat over time is a diffusion. Thus, by mimicking heat flow, it is possible to avoid the disadvantages that result from producing a blur by convolving with a Gaussian.

One of the fundamental mathematical properties of a heat flow is that the temperature at a point in a solid is exactly the average of the temperature around any imaginary circle drawn around that point. In the image context, this means every pixel is the average of its surrounding pixels. Running multiple passes of averaging over a digital image emulates heat flow and produces a smearing of edges in the image, most notably at the relatively significant edges.

Overview

In one embodiment of the invention, a type of diffusion applied to the digital image is averaging the values of the immediately neighboring pixels to obtain a blurred image. The amount of blurring is directly proportional to the number of times diffusion is applied to the image. Thereafter, the difference between the final blurred image and the original image is added to the original image, producing a sharpened image. This difference, before it is added to the original image, can be weighted by the user so as to allow the user to determine how sharp the image will be.

Advantages of Diffusion

Performing diffusion to smear a digital image not only requires significantly less calculation than Gaussian blurring, but it also introduces less noise into the image. One principle to note is that the Gaussian bell-shaped characteristic is not crucial in blurring, whereas smoothness is crucial. Thus, the key in blurring an image before sharpening is to retain smoothness and dispense with shape.

Diffusion is inherently smooth (in principle, infinitely smooth), so it introduces less noise. Diffusion results in a smoother blur than convolution with a Gaussian because the Gaussian's kernel has to be truncated. Diffusion is also infinitely precise whereas a truncated Gaussian is not. Furthermore, although discretization magnifies the non-smoothness of a truncated Gaussian, diffusion does not suffer from discretization error. Convolution with a Gaussian kernel constructs, in principle, a superposition solution to a diffusion equation, allowing every pixel to diffuse separately (but approximately, in a digital context), then combining the results. The theoretical result is infinitely smooth and has an averaging property. Approximating the diffusion process (the proposed algorithm) instead of approximating the result of an exact, theoretical diffusion over a longer period of time, can emphasize the averaging property by applying it repeatedly, and can reduce the effects of noise by always dealing with multiple pixels at once.

Another advantage that diffusion has over Gaussian blurring is that diffusion smears faster where edges are sharper; so, in effect, diffusion blurs differently in different parts of the image. In contrast, Gaussian blurs are uniform and approximate infinite extent in every direction. Diffusion smears more rapidly across higher gradients (where the change in brightness is greatest), which means that the rate of diffusion is directly proportional to the gradient. And since diffusion spreads faster across edges, the smearing phase requires less diffusion than Gaussian blurring. This non-uniform smearing effect is desirable in image sharpening because the choice to sharpen inherently means that the user wants to accentuate differences primarily along the significant edges of an image.

By way of analogy, think of the process of diffusion in the situation of a hot metal rod in a small tray of cool water. The rate of change in temperature is noticed most immediately at all points where the metal rod is touching the water (i.e. the highest gradient). Over time, the effects of the warmed-up water at the point of contact reaches the edges of the tray (i.e. infinitely smooth), although not as high originally as the temperature of the water at the contact point. As time elapses, the moment arrives where the heat from the metal rod is completely dispersed evenly in the tray of water. Correlatively, how much an edge in an image smears depends on "how long you wait" or the number of times diffusion is applied to an image.

Smearing Phase

According to one embodiment of the invention, diffusion is implemented by averaging the immediate "neighbors" of a pixel. Not only is averaging possible, unlike a true Gaussian, but it is quite fast due to the relatively few and simple calculations that need to be performed. The pixels immediately adjacent, vertically and horizontally, to the pixel in question are averaged to become the new value of the corresponding pixel in the blurred image.

Figure 1:
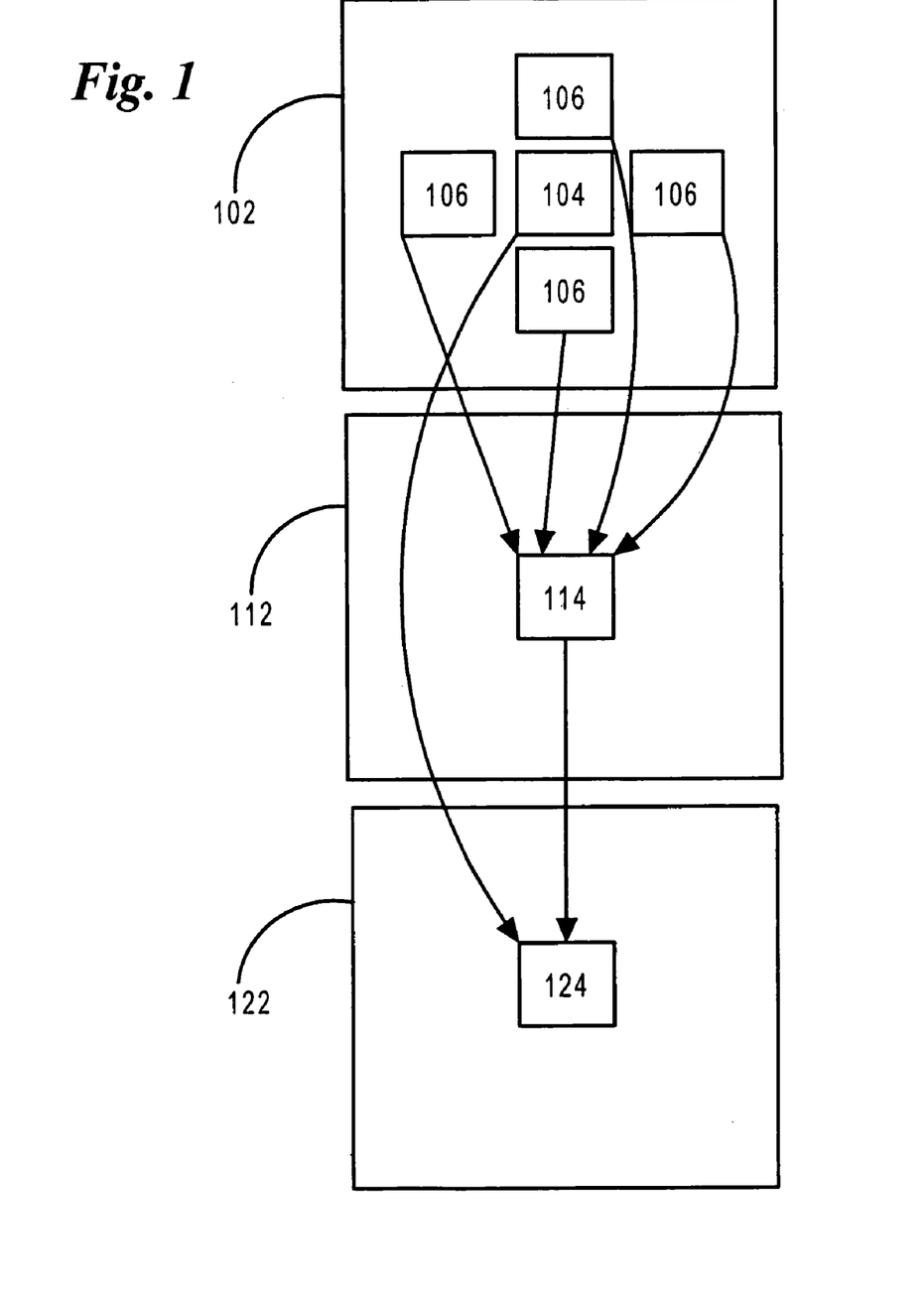
FIG. 1 is a block diagram that illustrates one way to average neighbor pixels in order to emulate diffusion.

FIG. 1 illustrates averaging as one way to emulate diffusion. Block 102 represents the original image, block 112 represents the blurred image, and block 122 represents the sharpened image. Pixels 104 and 106 are pixels in the original image 102. According to one embodiment, the values associated with neighbor pixels 106 of original pixel 104 are averaged to determine the value of blurred pixel 114 of blurred image 112, which corresponds to original pixel 104 in original image 102. A formula to emulate diffusion and produce a blur for a particular pixel in the original image, i.e., pixel x, may be the following:

$$u(x, \text{blur}) = \tfrac{1}{4} * [u(x+1) + u(x-1) + u(y+1) + u(y-1)]$$

where u(x, blur) is the value of the pixel in a blurred image (e.g., blurred pixel 114) corresponding to pixel x in the original image (e.g., original pixel 104); u(x+1) is the value of the pixel in the original image immediately to the right of pixel x; u(x−1) is the value of the pixel in the original image immediately to the left of pixel x; and so forth.

Graylevel and Color Images

In the example given above, each pixel is associated with a single value. Such a situation arises when sharpening a graylevel image. On the other hand, pixels in color images contain at least three values, one for each of red, green, and blue, together called the RGB value of a pixel. Therefore, if a graylevel image is being sharpened, then only the one value associated with each neighbor pixel of a given pixel is averaged to obtain a new value for a pixel in the blurred image corresponding to the given pixel. If a color image is being sharpened, then the red value associated with each neighbor pixel of a given pixel is averaged to obtain a new red value for a pixel in the blurred image corresponding to the given pixel. The same process is performed for the green and blue values.

Neighborhood

In another embodiment of the invention, the diffusive process is approximated by increasing the number of pixels considered "neighbors" to a given pixel before the neighbors are averaged. For instance, not only can non-immediate vertically and horizontally adjacent pixels be considered when averaging, the pixels that are diagonally adjacent to a particular pixel can also be taken into account when averaging. Specifically, since the immediate diagonally adjacent pixels are technically "farther away" than the immediate vertically and horizontally adjacent pixels, that factor can be taken into account when applying a weight to the diagonally adjacent pixels in the process of averaging them with the other neighboring pixels.

Blur Passes

A blur pass corresponds to a generated blurred copy of an original image. One blur pass means that one blurred image is generated. For every subsequent blur pass, another blurred copy is generated based on the previously generated blurred copy. In another embodiment of the invention, multiple blurring passes (hereinafter referred to as "passes") are performed during the smearing phase. Each pass generates one blurred image. The first pass generates a blurred image based on the original. The second pass generates a blurred image based on the first blurred image; and so forth.

When determining how many passes to perform on an image, the size of the "neighborhood," or the number of neighbors to a pixel considered in the smearing phase, is taken into account. Thus, as the neighborhood increases, less passes are required over an image. For example, if each pass takes into account only the four horizontally and vertically adjacent pixels, then perhaps four passes are required to produce a sufficiently blurred image. However, if each pass takes into account twenty neighboring pixels, then perhaps only one pass is required to produce a sufficiently blurred image.

Differencing Phase

During the differencing phase, the final blurred image is differenced with the original image to obtain a new set of one or more values associated with each pixel in the image. This new set of one or more values associated with each pixel is then added to the corresponding pixel in the original image, resulting in a sharper image.

For example, returning to FIG. 1 and the example above concerning the blurring phase, after the value of blurred pixel 114 is determined, the value of original pixel 104 is differenced with the value of blurred pixel 114. That difference is then added to the value associated with original pixel 104. The resulting value is a new value associated with a corresponding sharpened pixel 124 in sharpened image 122. A formula to generate a sharpened pixel may be the following:

$$u(x, \text{new}) = s * [u(x, \text{old}) - u(x, \text{blur})] + u(x, \text{old})$$

where u(x, old) is a value associated with pixel x (e.g., original pixel 104); u(x, new) is a value associated with a pixel (e.g., sharpened pixel 124) in the sharpened image corresponding to pixel x; s is the blurring amount; and u(x, blur) is a value associated with a pixel (e.g., blurred pixel 114) in the blurred image corresponding to pixel x.

For example, assume that the blurring amount is large, such as 0.5, and neighbor pixels 106 are associated with values 9, 13, 14, and 8. The average of these values is 11. Thus, the value 11 is stored for corresponding blurred pixel 114 of the blurred image 112. Also assume that original pixel 104 (i.e., u(x, old)) is associated with the value 12. Then, the value associated with corresponding sharpened pixel 124 (i.e., u(x, new)) would be 12−11+12=13.

Based on the above formula, if u(x, old) exceeds the brightness of its neighbor pixels (i.e., u(x, old)>u(x, blur)), then u(x, new) becomes brighter. If u(x, old) is darker than its neighbor pixels (i.e., u(x, old)<u(x, blur)), then u(x, new) becomes darker. Differences between u(x, old) and its surroundings are thus accentuated.

Adjusting Sharpness

In one embodiment of the invention, a user can use a sharpening "slider." A slider is an interface component that lets the user graphically select a value by sliding a knob within a bounded interval. The slider can show both major and minor tick marks within the bounded interval. Where the knob is positioned in the slider determines how much of the differencing value, obtained from differencing the original image with the blurred image, is added to the original image. This allows the user to modify the sharpness on a very small or very large scale. For example, the slider controls the amount of blur in the formula described above:

$$u(x, \text{new}) = s * [u(x, \text{old}) - u(x, \text{blur})] + u(x, \text{old}).$$

The slider may initially start at the value "0" in the bounded interval indicating no sharpening and thus no change to the original image. As the user moves the knob to the right, such as with a mouse, the differencing value is multiplied by a value greater than zero before it is added to the original image to obtain a sharpened image. The sharpened image will dynamically appear sharper as the knob moves rightward. As the knob moves to the left, the displayed sharpened image with dynamically become less sharp until the knob reaches zero, where the displayed image is once again the original image. If the slider is moved to the value −1, the same expression produces simply u(x, blur).

An image may not only be sharpened by increasing the blurring amount, but also by sharpening an image based on a previously sharpened image. Thus, in another embodiment, a formula for sharpening an image based on a first sharpened image may be:

$$u(x, \text{new}_2) = [u(x, \text{new}) - u(x, \text{blur}_2)] + u(x, \text{new})$$

where u(x, new)=s * [u(x, old)−u(x, blur)]+u(x, old); u(x, blur$_2$) is a value associated with a corresponding pixel in a blurred image of the sharpened image; and u(x, new$_2$) is a value associated with a corresponding pixel in a second sharpened image. Here again, a slider may be added to a user interface to allow the user to select the number of intermediate sharpened images generated before a final sharpened image is displayed to the user.

Resolution

A significant factor to consider in sharpening an image is resolution of the image. Image resolution describes the detail an image holds. As the number of pixels increases in a given area, resolution increases, which means more image detail. Sharpening is geometric, which means it is resolution dependent.

As described above, the more passes applied to an image, the more blurred the image becomes before it is differenced with the original image to obtain a sharpened image. The radius of a blur refers to the number of blurring passes. Because a relatively high resolution image requires more initial blurring to acquire a sharper image, one embodiment maintains that the radius of a blur is proportional to the resolution of the image. Thus, more passes are required on a high resolution image than on a low resolution image.

In one embodiment, the radius of a blur is pre-determined, by a developer of photo editing software, based on the resolution of an image. For example, an image with a resolution image below a first threshold may have a blur radius of two, whereas an image with a resolution over a second threshold may have a blur radius of fourteen. In another embodiment, a user determines the radius of a blur using a slider, similar to the slider described above. Thus, the user has control over the blur radius that results in the best sharpening effect for the user.

Hardware Overview

Figure 2:
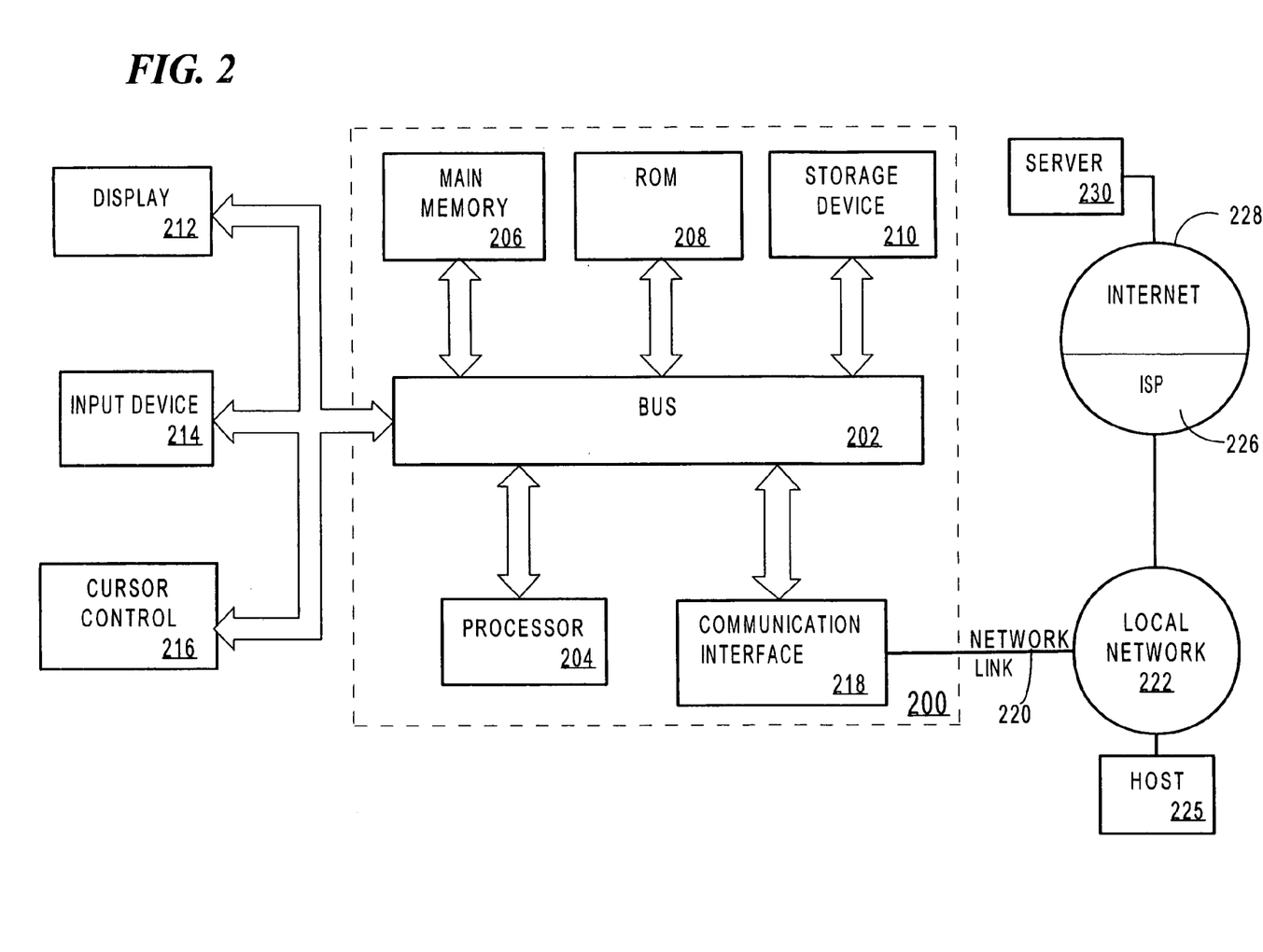
FIG. 2 is a block diagram that illustrates a computer system upon which an embodiment of the invention may be implemented.

FIG. 2 is a block diagram that illustrates a computer system 200 upon which an embodiment of the invention may be implemented. A computer system as illustrated in FIG. 3 is but one possible system on which embodiments of the invention may be implemented and practiced. For example, embodiments of the invention may be implemented on any suitably configured device, such as a handheld or otherwise portable device, a desktop device, a set-top device, a networked device, and the like, configured for containing and/or playing audio. Hence, all of the components that are illustrated and described in reference to FIG. 3 are not necessary for implementing embodiments of the invention.

Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 220 might transmit a requested code for an application program through Internet 228, ISP 226, local network 222 and communication interface 218. The received code may be executed by processor 204 as it is received, and/or stored in storage device 210, or other non-volatile storage for later execution. In this manner, computer system 200 may obtain application code in the form of a carrier wave.

Extensions and Alternatives

Alternative embodiments of the invention are described throughout the foregoing description, and in locations that best facilitate understanding the context of such embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A machine-implemented method comprising the steps of:
   generating a first blurred image of an original image; and
   generating a second blurred image based on the first blurred image;
   generating a sharpened image based on the original image and a third blurred image;
   wherein the step of generating the first blurred image comprises:
      determining a first set of neighbor pixels of a first pixel in the original image, and
      assigning to a first blurred pixel in the first blurred image a set of one or more values that are based on averaging a set of one or more values associated with said first set of neighbor pixels;
   wherein the step of generating the second blurred image comprises:
      determining a second set of neighbor pixels of a particular pixel in the first blurred image, and
      assigning to a second blurred pixel in the second blurred image a set of one or more values that are based on averaging a second set of one or more values associated with said second set of neighbor pixels;
   wherein the third blurred image is either the second blurred image or a blurred image that is generated based on the second blurred image;
   wherein the steps are performed by one or more computing devices.

2. The method of claim 1, wherein the first blurred pixel in the first blurred image corresponds to the first pixel in the original image.

3. The method of claim 1, wherein the steps of determining the first set of neighbor pixels of the first pixel in the original image and assigning to the first blurred pixel are performed for each pixel in the original image.

4. The method of claim 1, wherein the step of generating the sharpened image based on the original image and the third blurred image includes the step of generating the sharpened image based on a difference between the set of one or more values associated with the first pixel in the original image and the set of one or more values associated with a pixel in the third blurred image.

5. The method of claim 4, wherein generating the sharpened image based on the difference includes the step of weighting, based on input from a user, a second difference between the set of one or more values associated with the first pixel in the original image and the set of one or more values associated with a pixel in the third blurred image.

6. The method of claim 1, further comprising the steps of:
   generating a fourth blurred image of the sharpened image; and
   generating a second sharpened image based on the sharpened image and a fifth blurred image;
   wherein the step of generating the fourth blurred image comprises:
      determining a second set of neighbor pixels of a pixel in the sharpened image;
      assigning to a pixel in the fourth blurred image a set of one or more values that are based on averaging a set of one or more values associated with said second set of neighbor pixels;
   wherein the fifth blurred image is either the fourth blurred image or a bluffed image that is generated based on the fourth blurred image.

7. The method of claim 1, wherein the number of intermediate blurred images upon which the third blurred image is based is based on input from a user.

8. The method of claim 1, wherein the number of intermediate blurred images upon which the third blurred image is based is based on the resolution of the original image.

9. The method of claim 1, wherein the first set of neighbor pixels are only pixels (a) immediately adjacent to and (b) vertically or horizontally aligned with said first pixel in the original image.

10. The method of claim 1, wherein the first set of neighbor pixels are determined based on input from a user.

11. The method of claim 1, wherein averaging a set of one or more values associated with said first set of neighbor pixels includes applying weights to the first set of neighbor pixels, prior to averaging the neighbor pixels, based on the positions of the first set of neighbor pixels relative to said first pixel in the original image.

12. A machine-implemented method comprising the steps of:
   generating a first blurred image of an original image by:
      determining a first set of neighbor pixels of a first pixel in the original image, wherein the first set of neighbor pixels include only pixels that are (a) immediately adjacent to and (b) vertically or horizontally aligned with the first pixel in the original image;
      assigning to a first blurred pixel in the first blurred image a set of one or more values that are based on averaging a set of one or more values associated with the first set of neighbor pixels; and
   generating the sharpened image based on the original image and a second blurred image;
   wherein the second blurred image is either the first blurred image or a blurred image that is generated based on the first blurred image;

wherein the steps are performed by one or more computing devices.

13. The method of claim 12, wherein the step of generating the sharpened image includes generating the sharpened image based on a difference between a set of one or more values associated with the at least one pixel in the original image and a set of one or more values associated with at least one pixel in the second blurred image.

14. A computer-readable storage medium storing one or more sequences of instructions, which instructions, when executed by one or more processors, cause the one or more processors to carry out the steps of:
   generating a first blurred image of an original image; and
   generating a second blurred image based on the first blurred image;
   generating a sharpened image based on the original image and a third blurred image;
   wherein the step of generating the first blurred image comprises:
      determining a first set of neighbor pixels of a first pixel in the original image, and
      assigning to a first blurred pixel in the first blurred image a set of one or more values that are based on averaging a set of one or more values associated with said first set of neighbor pixels;
   wherein the step of generating the second bluffed image comprises:
      determining a second set of neighbor pixels of a particular pixel in the first blurred image, and
      assigning to a second blurred pixel in the second bluffed image a set of one or more values that are based on averaging a second set of one or more values associated with said second set of neighbor pixels;
   wherein the third blurred image is either the second blurred image or a blurred image that is generated based on the second blurred image.

15. The computer-readable storage medium of claim 14, wherein the first blurred pixel in the first blurred image corresponds to the first pixel in the original image.

16. The computer-readable storage medium of claim 14, wherein the steps of determining the first set of neighbor pixels of the first pixel in the original image and assigning to the first blurred pixel are performed for each pixel in the original image.

17. The computer-readable storage medium of claim 14, wherein the step of generating the sharpened image based on the original image and the third blurred image includes the step of generating the sharpened image based on a difference between the set of one or more values associated with the first pixel in the original image and the set of one or more values associated with a pixel in the third blurred image.

18. The computer-readable storage medium of claim 17, wherein generating the sharpened image based on the difference includes the step of weighting, based on input from a user, a second difference between the set of one or more values associated with the pixel in the original image and the set of one or more values associated with a pixel in the third blurred image.

19. The computer-readable storage medium of claim 14, wherein said instructions are instructions, which, when executed by the one or more processors, further cause the one or more processors to carry out the steps of:
   generating a fourth blurred image of the sharpened image; and
   generating a second sharpened image based on the sharpened image and a fifth blurred image;
   wherein the step of generating the fourth blurred image comprises:
      determining a second set of neighbor pixels of a pixel in the sharpened image;
      assigning to a pixel in the fourth blurred image a set of one or more values that are based on averaging a set of one or more values associated with said second set of neighbor pixels;
   wherein the fifth blurred image is either the fourth blurred image or a blurred image that is generated based on the fourth blurred image.

20. The computer-readable storage medium of claim 14, wherein the number of intermediate blurred images is based on input from a user.

21. The computer-readable storage medium of claim 14, wherein the number of intermediate blurred images is based on the resolution of the original image.

22. The computer-readable storage medium of claim 14, wherein the first set of neighbor pixels are determined based on input from a user.

23. The computer-readable storage medium of claim 14, wherein averaging includes applying weights to the first set of neighbor pixels, prior to averaging the neighbor pixels, based on the positions of the neighbor pixels relative to said first pixel in the original image.

24. A computer-readable storage medium storing one or more sequences of instructions, which instructions, when executed by one or more processors, cause the one or more processors to carry out the steps of:
   generating a first blurred image of an original image by:
      determining a first set of neighbor pixels of a first pixel in the original image, wherein the first set of neighbor pixels include only pixels that are (a) immediately adjacent to and (b) vertically or horizontally aligned with the first pixel in the original image;
      assigning to a first blurred pixel in the first blurred image a set of one or more values that are based on averaging a set of one or more values associated with the first set of neighbor pixels; and
   generating the sharpened image based on the original image and a second blurred image;
   wherein the second blurred image is either the first blurred image or a blurred image that is generated based on the first blurred image.

25. The computer-readable storage medium of claim 24, wherein the step of generating the sharpened image includes generating the sharpened image based on a difference between a set of one or more values associated with the first pixel in the original image and a set of one or more values associated with at least one pixel in the second blurred image.

26. A system comprising:
   one or more processors;
   a memory coupled to said one or more processors;
   one or more sequences of instructions which, when executed, cause said one or more processors to perform the steps of:
      generating a first blurred image of an original image; and
      generating a second blurred image based on the first blurred image;
      generating a sharpened image based on the original image and a third blurred image;
      wherein the step of generating the first blurred image comprises:
         determining a first set of neighbor pixels of a first pixel in the original image, and
         assigning to a first blurred pixel in the first blurred image a set of one or more values that are based on averaging a set of one or more values associated with said first set of neighbor pixels;

wherein the step of generating the second blurred image comprises:

determining a second set of neighbor pixels of a particular pixel in the first blurred image, and assigning to a second blurred pixel in the second bluffed image a set of one or more values that are based on averaging a second set of one or more values associated with said second set of neighbor pixels;

wherein the third blurred image is either the second blurred image or a blurred image that is generated based on the second blurred image.

27. A system comprising:

one or more processors;

a memory coupled to said one or more processors;

one or more sequences of instructions which, when executed, cause said one or more processors to perform the steps of:

generating a first blurred image of an original image by:

determining a first set of neighbor pixels of a first pixel in the original image, wherein the first set of neighbor pixels include only pixels that are (a) immediately adjacent to and (b) vertically or horizontally aligned with the first pixel in the original image;

assigning to a first blurred pixel in the first blurred image a set of one or more values that are based on averaging a set of one or more values associated with the first set of neighbor pixel; and generating the sharpened image based on the original image and a second blurred image;

wherein the second blurred image is either the first blurred image or a blurred image that is generated based on the first blurred image.

\* \* \* \* \*

UNITED STATES PATENT AND TRADEMARK OFFICE
CERTIFICATE OF CORRECTION

| | | |
|---|---|---|
| PATENT NO. | : 7,643,698 B2 | Page 1 of 1 |
| APPLICATION NO. | : 11/316776 | |
| DATED | : January 5, 2010 | |
| INVENTOR(S) | : Russell M. Reid | |

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 683 days.

Delete the phrase "by 683 days" and insert -- by 1017 days --.

In column 1, line 29, delete "Gaussain," and insert -- Gaussian, --, therefor.

In column 1, line 56, delete "Gaussain" and insert -- Gaussian --, therefor.

In column 10, line 30, in claim 6, delete "bluffed" and insert -- blurred --, therefor.

In column 11, line 26, in claim 14, delete "bluffed" and insert -- blurred --, therefor.

In column 11, line 30, in claim 14, delete "bluffed" and insert -- blurred --, therefor.

In column 13, line 8, in claim 26, delete "bluffed" and insert -- blurred --, therefor.

Signed and Sealed this

Fourteenth Day of September, 2010

David J. Kappos
*Director of the United States Patent and Trademark Office*